United States Patent [19]

Oberhardt et al.

[11] 4,100,797

[45] Jul. 18, 1978

[54] NON-INVASIVE METHOD AND APPARATUS FOR INSTANTANEOUS FLOW MEASUREMENT OF A SEGMENTED FLUID STREAM

[75] Inventors: Bruce J. Oberhardt, Hartsdale; Donald F. Kopelman, Hastings-on-Hudson, both of N.Y.

[73] Assignee: Technicon Instruments Corporation, Tarrytown, N.Y.

[21] Appl. No.: 759,928

[22] Filed: Jan. 17, 1977

[51] Int. Cl.² .............................................. G01F 1/56
[52] U.S. Cl. .................................................. 73/194 E
[58] Field of Search ......... 73/194 R, 194 E, DIG. 11; 356/28; 324/175; 250/205, 222 R, 573; 128/205 F, 214 E, DIG. 13

[56] References Cited

U.S. PATENT DOCUMENTS

| | | | |
|---|---|---|---|
| 2,340,455 | 2/1944 | Davis | 73/194 R X |
| 3,199,346 | 8/1965 | Stewart | 73/194 R |
| 3,628,891 | 12/1971 | Isreeli | 417/53 |
| 3,700,904 | 10/1972 | Stobble et al. | 128/214 E X |
| 4,027,319 | 5/1977 | Borrello et al. | 357/30 |

*Primary Examiner*—Charles A. Ruehl
*Attorney, Agent, or Firm*—S. P. Tedesco

[57] ABSTRACT

Method and apparatus for the determination of the instantaneous flow velocity of a segmented fluid stream in an optically transparent conduit are disclosed, and comprise light-sensitive flow signal generation means operatively associated with said conduit and operable to generate a signal including a characteristic which is representative of said instantaneous flow velocity, and flow signal processing means which are operable to detect said characteristic and provide a signal indicative of said instantaneous flow velocity.

17 Claims, 11 Drawing Figures

NON-INVASIVE METHOD AND APPARATUS FOR INSTANTANEOUS FLOW MEASUREMENT OF A SEGMENTED FLUID STREAM

BACKGROUND OF THE INVENTION

1. Field of the Invention.

This invention relates to new and improved, non-invasive method and apparatus for instantaneous flow measurement of a segmented fluid stream in an optically transparent conduit of a continuous flow system.

2. Description of the Prior Art

Although instantaneous flow measurement methods and apparatus are known in the prior art for detecting flow in fluid conduits, the same will, in many instances, be found to be invasive in requiring the disposition of detecting means within the conduit, and to thus be generally inapplicable for use in continuous flow, automated analysis systems which operate through use of precisely fluid-segmented liquid stream. More specifically, and taking for example those prior art flow measurement methods and apparatus which operate through use of a heat-sensitive detecting device in the nature of a thermistor which is disposed in the conduit within the fluid stream, it will be readily understood by those skilled in this art that the presence of the detecting device in the fluid stream presents an obstruction to fluid flow in the conduit, which obstruction can operate to generate turbulence with attendant destruction of the essentially precise segmentation of the fluid stream. As a result, such prior art methods and apparatus would not be applicable for use in automated analysis systems which operate through use of precisely segmented fluid streams. Additional problems which would arise regarding the use of invasive, heat sensitive flow detecting means in continuous flow, automated analysis systems which operate through use of precise fluid-segmented liquid streams, include the necessity for precise calibration thereof in accordance with each of the different heat capacities of each of the different liquids which may be flowing in each of the different conduits of a multi-conduit or multi-channel analysis system; as well as the insulating effects of the fluid segments on the heat sensitive flow detecting device which can lead to erroneous readings. Also, it is believed clear that the disposition of flow detecting means in any conduit through which a fluid is being pumped in any kind of system can only function to increase the flow resistance through said conduit to thus materially increase the energy required for fluid pumping, and especially in those instances wherein the conduit is of small I.D.; while the disposition of the flow detecting means in the conduit can lead to corrosion of the former in those instances wherein the fluid flowing in the conduit is corrosive. Too, the actual disposition of the flow detecting means in the conduit can present manufacturing problems, especially in those instances wherein the conduit I.D. is small, which problems would, of course, be magnified in those instances wherein it becomes necessary or desirable to change the location in the conduit at which instantaneous flow measurement is to be made to thus require re-location of the detecting means in the conduit.

Although non-invasive, prior art instantaneous flow measurement method and apparatus in the nature, for example, of the video analysis system disclosed in the article, "Video Analysis of Low Flow Rates" by A.D. Falco, W.R. Tompkins and M. Intaglietta s published in Microvascular Research 6, pp. 362–365 (1973) are known, the same may be understood to be of particularly complex and expensive design and construction in requiring a CRT or like device, and complex logic including special switching circuitry to generate and control the position of a single "window" which isolates the area of interest in a television video frame; and to additionallycall for the introduction of a suitable dye into the fluid stream to insure sufficient video contrast.

OBJECTS OF THE INVENTION

It is, accordingly, an object of this invention to provide new and improved method and apparatus for instantaneous flow measurement of a segmented fluid stream in a conduit which are non-invasive in that the same do not require the disposition of detecting means in the conduit nor any physical connection or contact therewith.

Another object of this invention is the provision of method and apparatus as above which are of relatively simple and inexpensive design and construction when compared to the non-invasive, instantaneous flow measurement methods and apparatus of the prior art.

Another object of this invention is the provision of method and apparatus as above which require the use of only readily available, state-of-the-art components of proven dependability to provide for particularly high reliability of operation.

Another object of this invention is the provision of method and apparatus as above which do not require the addition of anything to the fluid stream to enable instantaneous flow measurement.

A further object of this invention is the provision of method and apparatus as above which make possible the ready and convenient change in the conduit location at which instantaneous flow measurement is to be effected.

A further object of this invention is the provision of method and apparatus as above which are particularly, though not exclusively, adapted for use in automated, multi-channel blood analysis systems of the type manufactured and marketed as "The SMAC System" by applicants' Assignee, Technicon Instruments Corporation of Tarrytown, New York.

DESCRIPTION OF THE DRAWINGS

The above and other objects and significant advantages of our invention are believed made clear by the following detailed description thereof taken in conjunction with the accompanying drawings wherein.

SUMMARY OF THE DISCLOSURE

As disclosed herein, the non-invasive method and apparatus of the invention are for use in the instantaneous measurement of the flow velocity of a segmented fluid stream in an optically transparent conduit and, to that effect, comprise a light source and position sensitive optical detecting means which are respectively disposed to opposite sides of said conduit in such manner that the light from the light source will pass through said fluid stream for attenuation by said fluid segments in accordance with the respective optical densities thereof, and impingement upon the active surface of said detecting means. Said detecting means are operable to detect the position of the centroid of the light impinging thereon and generate an output signal having a characteristic representative of the change in centroid position; which output signal is applied to signal processing means for provision of a signal indicative of the instantaneous velocity of said fluid stream in said conduit. A signal representative of the inner diameter of said conduit is also applied to the signal processing means, and the latter are operative to combine said signals and provide a signal indicative of the instantaneous rate of flow of said fluid stream through said conduit.

DETAILED DESCRIPTION OF THE INVENTION

Figure 1:
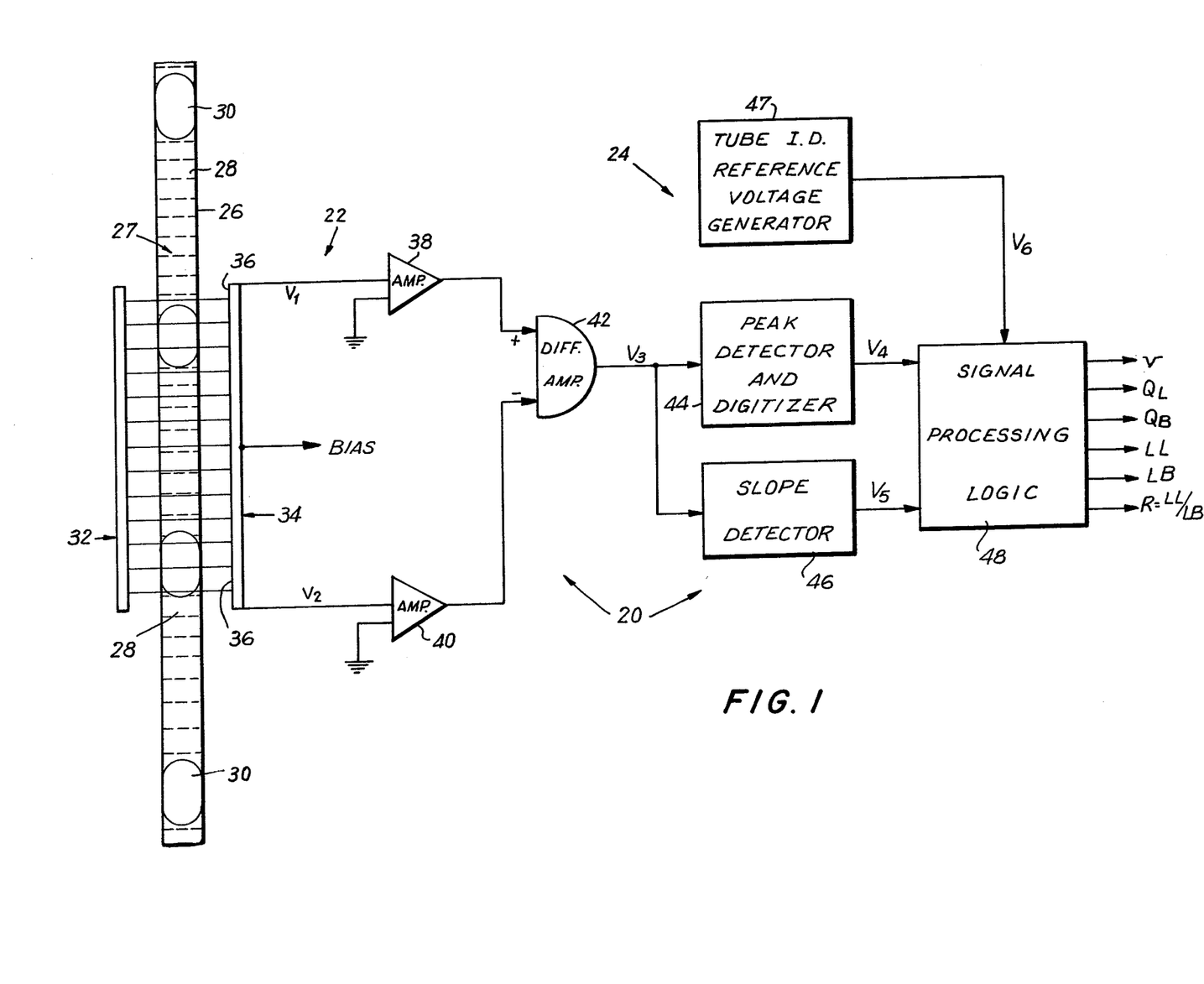
FIG. 1 is a schematic diagram of an instantaneous flow measurement system configured and operative in accordance with the teachings of the method and apparatus of our invention for instantaneous flow measurement in a fluid-segmented liquid stream through the depicted conduit.

Referring now to FIG. 1, a system constructed and operative in accordance with the teachings of our invention for non-invasive instantaneous measurement of flow is indicated generally at 20, and comprises flow signal generation means as indicated generally at 22 and flow signal processing means as indicated generally at 24.

The flow signal generation means 22 are depicted in operative relationships with an optically transparent conduit 26 through which is flowing a precisely fluid segmented liquid stream 27 which comprises alternating slugs of liquid 28 and fully occluding separating segments or bubbles of air 30. The conduit 26 may, for example, be constituted by one of the manifold tubes of a continuous flow, automated blood analysis system of the type disclosed in U.S. Pat. No. 3,241,432, and manufactured and marketed by applicants' Assignee, Technicon Instruments Corporation of Tarrytown, New York as an "Autoanalyzer;" in which instance the fluid segmented liquid stream 27 would be pumped at constant flow rate through the conduit 26 and the slugs of liquid 28 could, for example, be constituted by solutions of a blood sample portion and a reagent for colorimetric quantitative analysis, to thus provide for clear demarcation between the respective optical densities of the liquid segments 28 and the air bubbles 30.

The flow signal generation means 22 comprise a line light source as indicated generally at 32 and which may, for example, take the form of a line filament bulb and operatively associated milk glass light diffusion means. The line light source 32 is disposed as shown adjacent one side of the tube 26 so as to be generally parallel thereto.

Position sensitive optical detecting means are indicated generally at 34 and are disposed as shown in generally parallel manner to the side of tube 26 opposite the line light source 32, whereby may be readily understood that the light from the latter will traverse the stream 27 flowing in tube 26 for impingement upon the active surface 36 of the detecting means 34. The detecting means 34 may, for example, take the form of the single axis light position sensor as manufactured and marketed by United Detector Technology, Inc. of Santa Monica, California under the designation "LSC Series." Briefly described, this sensor comprises a photoelectric device taking the form of an appropriately biased, generally rectangular 3-terminal Schottky barrier detector diode which senses the centroid of a light spot or spots, area or line segment impinging on the active surface 36 thereof, and which produces continuous analog output voltages $V_1$ and $V_2$ which are proportional to the location of the centroid of the light spot or spots, area or line segment along said active surface. Thus, may be understood that as a spot or spots of light, which result from the relatively unattenuated passage of the light from line source 32 through the air bubbles 30, as compared to the relatively attenuated passage of that light through the liquid segments 28 of substantially higher optical density, impinge on and move along the active surface 36 of the sensor 34 in response to and in the direction of the indicated flow of stream 27 in tube 26 from one end of said active surface to the other, output voltages $V_1$ and $V_2$ which are, at any given time, respectively proportional to the location of the centroid of said light spot(s) on said active surface will be produced; it being believed clear that $V_2$ will be at its maximum and $V_1$ at its minimum when said centroid is located just adjacent the upper edge of the active surface 36 as seen in FIG. 1, that $V_1$ and $V_2$ will be substantially equal at the null point when said centroid is located substantially midway along said active surface, and that $V_1$ will be at its maximum and $V_2$ at its minimum when said centroid is located just adjacent the lower edge of said active surface as seen in FIG. 1.

Although use of position sensitive optical detecting means 34 which include a uniform and continuous Schottky barrier provides for particularly high position sensitivity, resolution and off center absolute position accuracy with the latter being independent of light spot size and resolution, and null sensitivity being independent of incident power changes, it is nonetheless to be clearly understood that other and different position sensitive optical detecting means may be utilized for flow signal generation purposes. More specifically, said position sensitive optical detecting means may, for example, take the alternative form of a charge coupled device in the nature of that manufactured and marketed by Fairchild Semiconductor of Mountain View, California as the "CCD131 1024-Element Linear Image Sensor", which functions to provide a single digital output signal indicative of the position of light impinging thereon. As a result, integration of that output signal to provide the rate of change or slope thereof would be required in order to arrive at the instantaneous velocity of the segmented stream.

Amplifiers are depicted at 38 and 40, and the respective output voltages $V_1$ and $V_2$ are applied thereto as indicated from the detecting means 34 for obvious purpose.

A differential amplifier is depicted at 42, and the appropriately amplfied output voltages $V_1$ and $V_2$ are applied thereto as indicated to result in the provision of a flow signal voltage $V_3$, the rate of change in which is proportional in real time to the instantaneous velocity v of the fluid stream 27 in conduit 26.

Referring now to the flow signal processing means 24, the same will be seen to respectively comprise peak detector and digitizer means as schematically indicated at 44, slope detector means as schematically indicated at 46, reference voltage generation means as indicated at 47, and signal processing logic means as schematically indicated at 48 and which will readily be understood by those skilled in this art to primarily comprise a variety of appropriately configured and interrelated multiplier and divider circuits.

Application as indicated of the analog flow signal voltage $V_3$ to the peak detector and digitizer means 44 will result in the generation and application as shown of digital peak voltage signals $V_4$ to the signal processing logic means 48; while application as indicated of the analog flow signal voltage $V_3$ to the slope detector means 46 will result in the generation and application as shown of digital rate of change or slope signals $V_5$ to the signal processing logic means 48. In addition, a digital reference voltage or level $V_6$ which is indicative of the inner diameter of tube 26 is applied as shown from reference voltage generation means 47 to the logic means 48.

Figure 2:
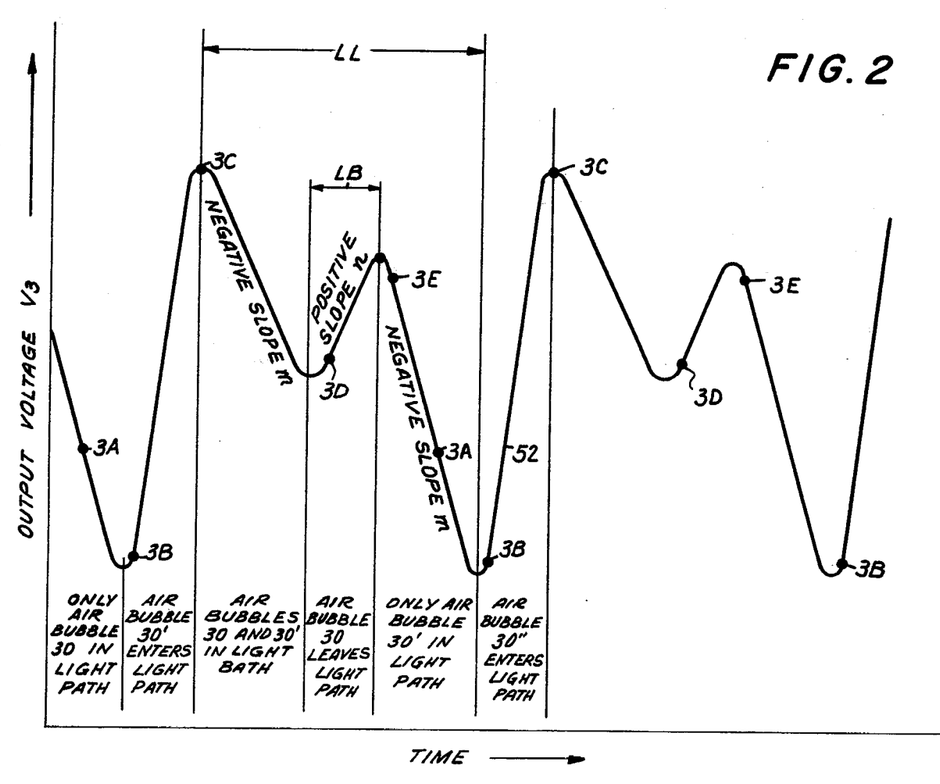
FIG. 2 is a graph depicting the flow signal output voltage provided by the system of FIG. 1 as plotted against time.

Operation of the system of our invention under conditions wherein the precisely air segmented liquid stream 27 is being pumped in continuous manner at substantially constant flow rate through tube 26, and wherein the respective lengths of the liquid segments 28, the air bubbles 30 and the active surface 36 of the position sensitive optical detecting means 34 are predetermined to insure that there is always at least one air bubble 30 in the light path of the detecting means 34, may, for example, result in the provision from differential amplifier 42 of a flow signal output voltage $V_3$ in the nature of that depicted at 52 in FIG. 2 which is a plot of that output voltage versus time once steady state operating conditions have been reached. Although the respective ratios between the length LL of a liquid segment 28, the length LS of the active surface 36 of the detecting means 34, and between the length LB of an air bubble 30 and the length LS, may vary quite widely from system to system, it may be understood that respective values of approximately 0.5 and approximately 0.2 are representative of those ratios under actual operating conditions.

FIGS. 3A, 3B, 3C, 3D and 3E sequentially depict the operational conditions in tube 26 relative to detecting means 34 for a complete operational cycle or passage of two air bubbles 30 through the tube 26; and those FIGS. are cross-referenced for purposes of correlation of description with the plot 52 of the output voltage $V_3$ of FIG. 2 to generally identify in each instance the output voltage resulting from each of said operational conditions.

Figure 3A:
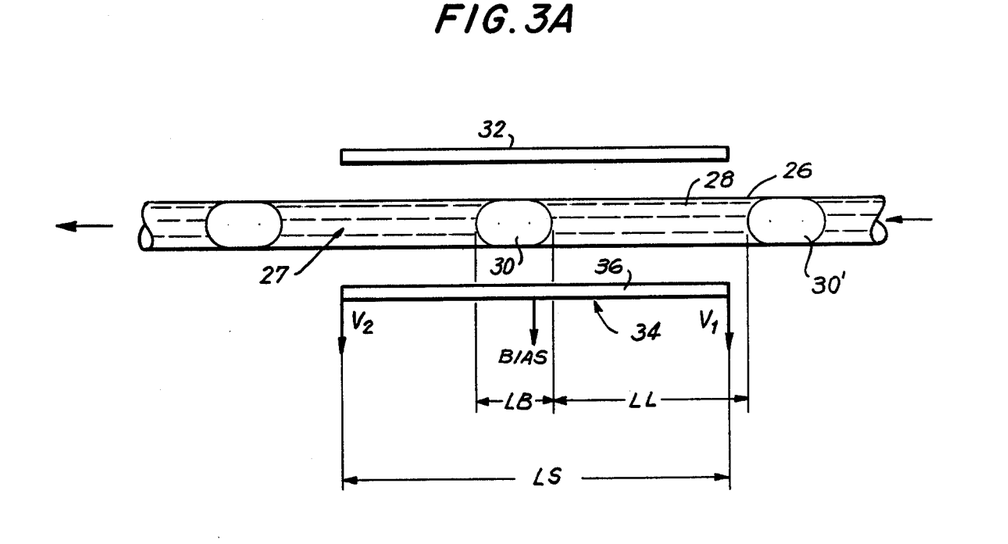
FIGS. 3A, 3B, 3C, 3D and 3E are a series of schematic diagrams depicting a succession of illustrative operating conditions of the systems of FIG. 1, and these FIGS. are correlated with the graph of FIG. 2 for completeness of description.
Figure 3B:
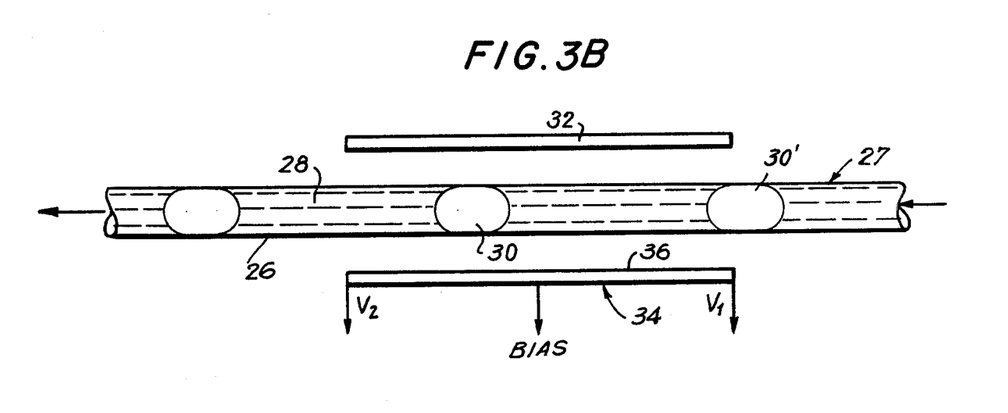

More specifically, and considering first FIG. 3A which illustrates the operational conditon in tube 26 wherein a single air bubble 30 is in the light path of the detecting means 34 and is moving toward completion of its traverse of said light path, FIG. 2 is believed to make clear that the output voltage $V_3$ is, at that point in time, decreasing toward its minimum value. This decrease will continue until the commencement of the entry of a second air bubble $30^1$ into the light path of detecting means 34 as depicted in FIG. 3B, with air bubble 30 still fully within said light path, whereupon, the direction of change in the output voltage $V_3$ will be reversed with the same commencing to increase, again in the manner made clear by the appropriately cross-referenced output voltage plot 52 of FIG. 2.

Figure 3C:
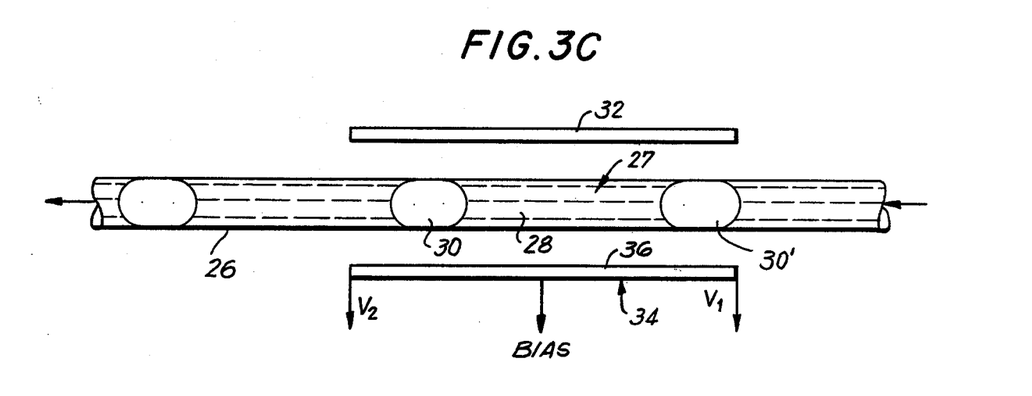

This increase in the output voltage $V_3$ will continue until entry of the second air bubble $30^1$ into the light path of detecting means 34 is substantially completed in the manner depicted by FIG. 3C whereupon the said output voltage will have reached the maximum level thereof and commenced to again decrease as shown in FIG. 2.

Figure 3D:
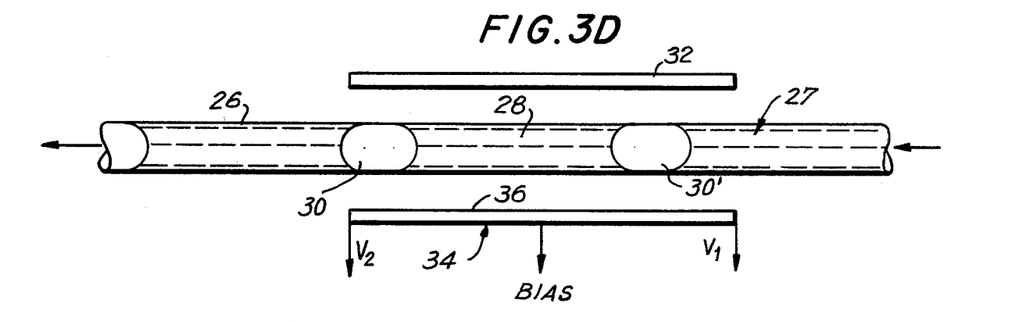

Operation of the system with both air bubbles 30 and $30^1$ fully within the light path of the detecting means 34 and traversing the same within tube 26 in the direction indicated will then occur with attendant continuation of the decrease in the level of the output voltage $V_3$ as made clear by FIG. 2, until such time as the exit of the leading air bubble 30 from said light path is commenced as illustrated by FIG. 3D whereupon the level of said output voltage will again have commenced to increase.

Figure 3E:
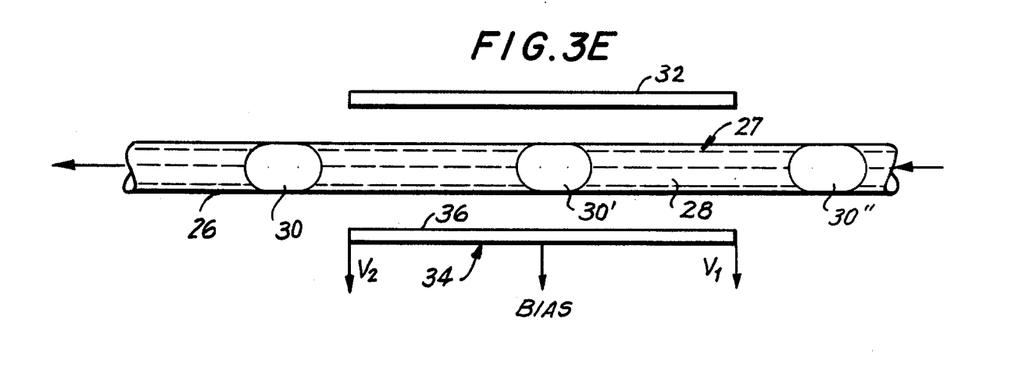

This increase in the level of the output voltage $V_3$ will continue concomittantly with the exit of the leading air bubble 30 from the light path of detecting means 34, and will end in the manner shown by FIG. 2 with the completion of that bubble exit as illustrated by FIG. 3E whereupon decrease in the level of said output voltage will again have been commenced.

This decrease in the level of the output voltage $V_3$ will continue concomittantly with continuation of the traverse by the air bubble $30^1$, only, of the light path of detecting means 34 to again result in the assumption by the system of the operational conditions depcted by FIG. 3A and repetition of the operational cycle as described for so long as continuous flow pumping of the segmented stream 27 through the tube 26 continues.

Essential features of the flow signal output voltage plot 52 of FIG. 2 include the negative slope region m which corresponds to the instantaneous velocity of the segmented stream 27 through tube 26; the time duration of the positive slope region n which corresponds to the length LB of the air bubbles 30; and the time duration between the maximum output voltage level occuring upon the completion of air bubble entry into the light path of detecting means 34 and the minimum output voltage level occuring upon the commencement of entry of the immediately succeeding air bubble into said light path, which time duration corresponds to the length LL of the liquid segments.

Application of the output voltage signal $V_3$ from the differential amplifier 42 to suitable read-out means in the nature, for example, of a non-illustrated strip chart recorder to provide a readily observable and permanent record of said output voltage will, of course, result in the provision of the plot 52 on the strip chart; it being understood that, in such instance, the instantaneous flow velocity v of the segmented stream 27 in tube 26 will be equal to the negative slope m of the plot 52 as divided by a constant c which is equivalent to the constant speed at which the strip chart is equivalent to the constant speed at which the strip chart is being driven.

Application as shown in FIG. 1 of the digital rate of change or slope signals $V_5$ — which are, of course, indicative of both the rate of change of the negative and positive slope portions m and n of the plot 52 of FIG. 2 — and the digital peak signals $V_4$ from slope detector 46 and peak detector and digitizer means 44, respectively, to the logic means 48 will enable the computation and outputting by the latter as indicated of signals representing the instantaneous flow velocity v regarding the flow of the fluid stream 27 in the tube 26, the length LL of the liquid segments in said fluid stream, and the length LB of the air bubbles in said fluid stream, respectively. As a result, computation and outputting as indicated by the logic means 48 of signals representing the ratio R between these segment lengths are, of course, made possible.

In addition, and with the application as shown of the digital, tube I.D. reference voltage signal $V_6$ to the logic means 48, the latter become effective as indicated to compute and output signals representing the respective instantaneous flow rate QL of the liquid segments 28, and the instantaneous flow rate QB of the air bubbles 30, of the fluid stream 27 in tube 26. Simple addition would then, of course, suffice to compute the instantaneous total flow rate $Q_T$ of said stream.

Figure 4:
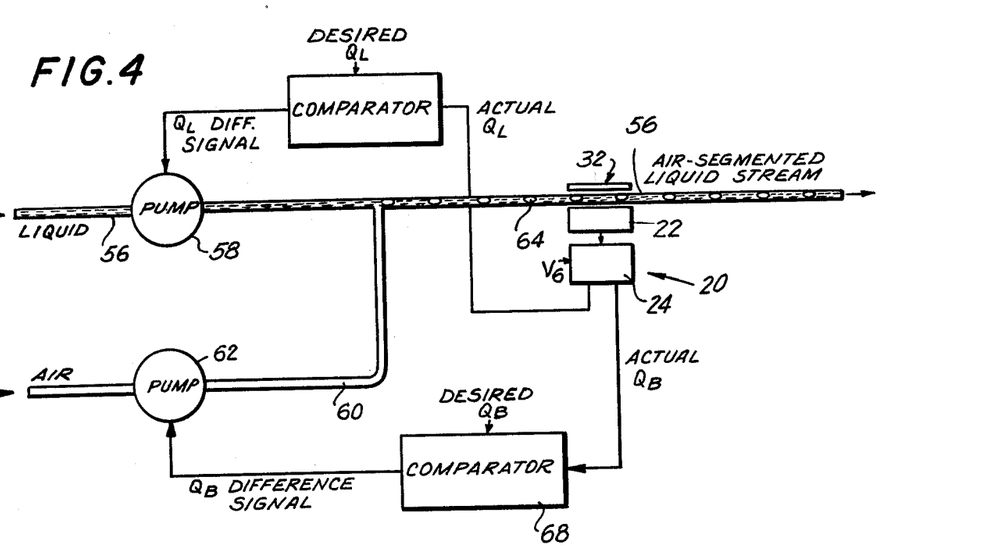
FIG. 4 is a schematic diagram depicting an application of the system of FIG. 1 to the monitoring and control of the flow rate of a fluid-segmented liquid stream which is being pumped through a conduit.

A representative system application of the method and apparatus of our invention to the monitoring and control of the total flow rate $Q_T$ of a segmented fluid stream is illustrated schematically in FIG. 4, and comprises a conduit 56 through which liquid is continuously pumped as indicated by a pump 58, and conduit 60 through which air is continuously pumped as indicated by pump 62. Conduit 60 merges as shown with conduit 56 downstream of pump 58 to continuously introduce fully occluding air segments of precisely determined extent into conduit 56, and to result in the continuous flow through the optically transparent portion of conduit 56 downstream of the conduit juncture of a precisely air-segmented liquid stream 64.

Non-invasive, instantaneous flow measurement means contructed and operative in accordance with the teachings of our invention are again indicated generally at 20 and are operatively disposed as shown relative to the optically transparent portion of conduit 56 to instantaneously measure the respective flow rates $Q_L$ and $Q_B$ of the air-segmented liquid stream flowing through said conduit portion.

A comparator is indicated at 66, and the signal representing the actual liquid segment flow rate $Q_L$ is applied thereto as shown. Also applied to comparator 66 is a signal representing the desired liquid segment flow rate $Q_L$. A signal representing the difference, if any, between the actual and desired liquid segment flow rates is applied as indicated from comparator 66 to pump 58, and that signal will be readily understood by those skilled in this art to be effective to control the amount of liquid being pumped by pump 58 per unit time.

A comparator is indicated at 68, and the signal representing the actual air segment or bubble flow rate $Q_B$ is applied thereto as shown along with a signal representing the desired air segment flow rate $Q_B$. A signal representing the difference, if any, between the actual and desired air segment flow rate is applied as indicated from comparator 68 to pump 62, that signal is effective to control the amount of air being pumped by pump 62 per unit time.

Under these conditions, it is believed clear that any variation between the actual and desired liquid segment flow rate, and/or between the actual and desired air segment flow rate, in the air-segmented liquid stream 64 will be substantially instantaneously detected and remedied, through appropriate change in the output of the relevant pump(s), to thus insure not only a substantially constant total flow rate $Q_T$ through conduit portion 64 but to also insure a substantially constant ratio R between the respective liquid and air segment flow rates $Q_L$ and $Q_B$. Of additionally significant advantage regarding the application of FIG. 4 is believed to be the fact that the same enables independent precise variation as desired in either of the liquid or air segment flow rates through suitable modification of the signal representing the desired flow rate in either instance as applied to the appropriate comparator.

Figure 5:
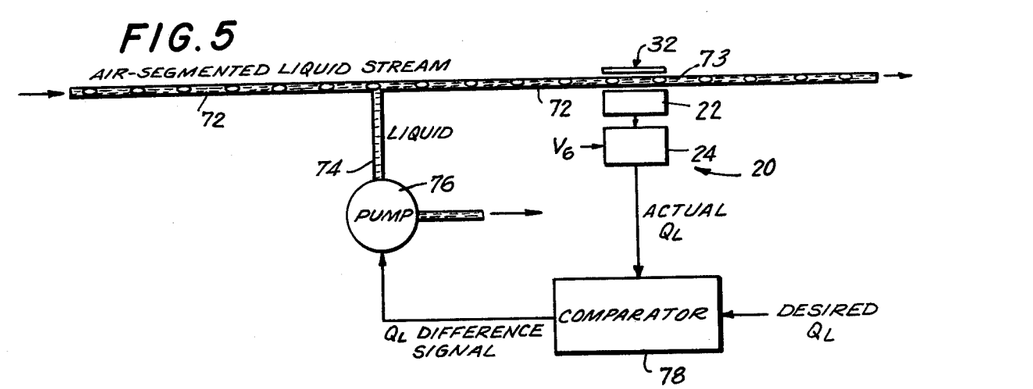
FIG. 5 is a schematic diagram depicting another application of the system of FIG. 1 to the flow rate monitoring and control of a fluid-segmented liquid stream being pumped through a conduit.

Another representative system application of the method and apparatus of our invention to the monitoring and control of the total flow rate $Q_T$ of a segmented fluid stream is illustrated schematically in FIG. 5, and comprises an optically transparent conduit 72 through which a precisely air-segmented liquid stream 73 is continuously flowing in the indicated direction. A conduit 74 branches downwardly as shown from conduit 72 and is effective as indicated through operation of pump 76 to withdraw portions of the liquid segments from stream 73 at a rate commensurate with the amount of liquid pumped by pump 76 per unit time. Instantaneous flow measurement means of the invention are again indicated generally at 20 and are operatively associated as shown with conduit 72 downstream of conduit 74 to measure the flow rate(s) through the former.

A comparator is indicated at 78, and the signal representing the instantaneous liquid segment flow rate $Q_L$ in conduit 72 downstream of conduit 74 is applied thereto as indicated from flow measurement means 20. Also applied as indicated to comparator 78 is a signal representing the desired liquid segment flow rate $Q_L$ through conduit 72 downstream of conduit 74. A signal representing the difference, if any, between the actual and desired light segment flow rate through the flow measurement means 20 of the invention is applied as indicated from comparator 78 to pump 76 and is operative to control the amount of liquid pumped by the latter per unit time.

In operation under condition, for example, wherein it is desired to reduce the volume of each of the liquid segments in stream 73 to a precisely predetermined extent by means of liquid segment portion withdrawal under the control of the pumping rate of pump 76, it is believed clear that this purpose may be readily and precisely accomplished in accordance with the instantaneous measurement of the liquid segment flow rate $Q_L$ by the flow measurement means 20 of the invention and the application therefrom as indicated to comparator 78 of the signal representing that flow rate. Again, precise control of the total flow rate $Q_T$ of the segmented stream 73 is made possible, as is precise change in that total flow rate through suitable modification of the external signal applied to comparator 78. Too, precise control in the ratio R is again easily and precisely accomplishable.

Figure 6:
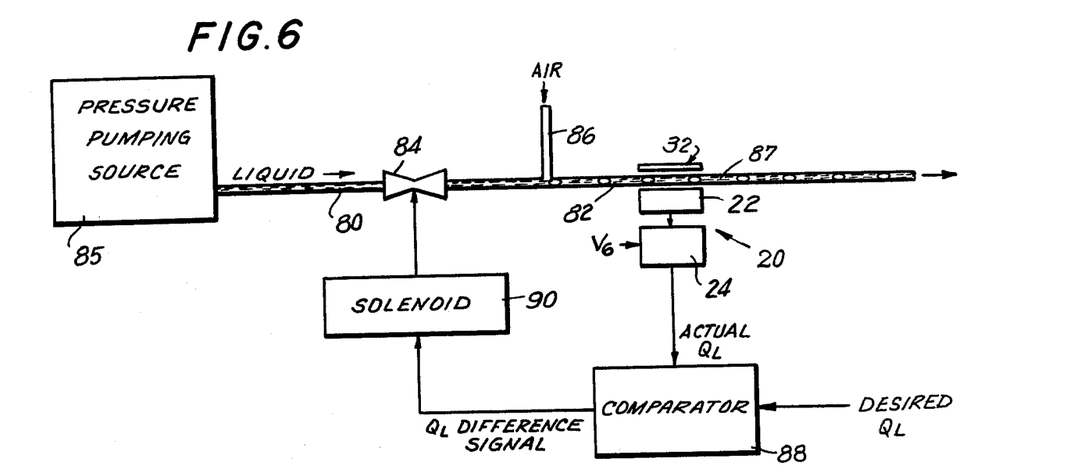
FIG. 6 is a schematic diagram depicting still another application of the system of FIG. 1 to flow rate monitoring and control.

Another representative application of the method and apparatus of our invention to the monitoring and control of the total flow rate $Q_T$ of a segmented fluid stream is illustrated schematically in FIG. 6, and comprises a conduit 80 which connects to an optically transparent conduit 82 through fluid flow restricting constrictor means 84. Pressure pumping means are indicated at 85 and are effective to pump a continuous liquid stream at substantially constant flow rate to and through constrictor means 84 into conduit 82. A conduit 86 joins as shown with conduit 82 and functions as indicated to introduce air into the liquid stream flowing in the latter to result in the flow of a precisely air segmented liquid stream 87 in conduit 82 downstream of the conduit juncture. The instantaneous flow measurement means of the invention are again indicated generally at 20 and are operatively associated as shown with the optically transparent conduit 82.

A comparator is indicated at 88, and each of the signal representative of the actual liquid segment flow rate $Q_L$ through conduit 82 and the signal representative of the desired liquid segment flow rate through that conduit are applied as indicated to comparator 88.

A solenoid, or similar electrically responsive mechanical device, is indicated at 90 and is mechanically connected as shown to flow constrictor means 84 in such manner that the solenoid can control the extent to which said constrictor means reduce liquid flow from pressure pumping means 85 through conduit 80 into optically transparent conduit 82. A signal which is representative of the difference, if any, between the actual and desired liquid segment flow rate is applied as indicated from comparator 88 to solenoid 90 and may thus be understood to be effective to precisely control the liquid flow rate through the constrictor means.

Under these conditions, it should be clear that substantially instantaneous detection and precise modification, if required, of the liquid segment flow rate $Q_L$ in the segmented stream 87 is made possible; as are the same accomplishments regarding the total flow rate $Q_T$ and the ratio R between the liquid and air segment flow rates.

By all of the above is believed made clear to those skilled in this art that the non-invasive method and apparatus of our invention are readily and precisely operable to comprehensively characterize the continuous flow pattern of an air segmented, liquid stream in an optically transparent conduit through the determination of instantaneous flow velocity, average flow velocity (divide by total time), liquid segment flow rate, air segment flow rate, liquid segment length and air segment length, respectively. As a result, it is to be clearly understood that the method and apparatus of the invention are readily utilizable in continuous flow systems of the nature described to detect and automatically remedy, or at least indicate, malfunctions in the nature of time variations in flow, changes in liquid segment - air segment proportioning, air segment break-up (this will be evidenced by drastic change in the LB signal read-out), steady variation or pulsations in system pressure, and/or the presence of restrictions in the flow system conduits.

Figure 7:
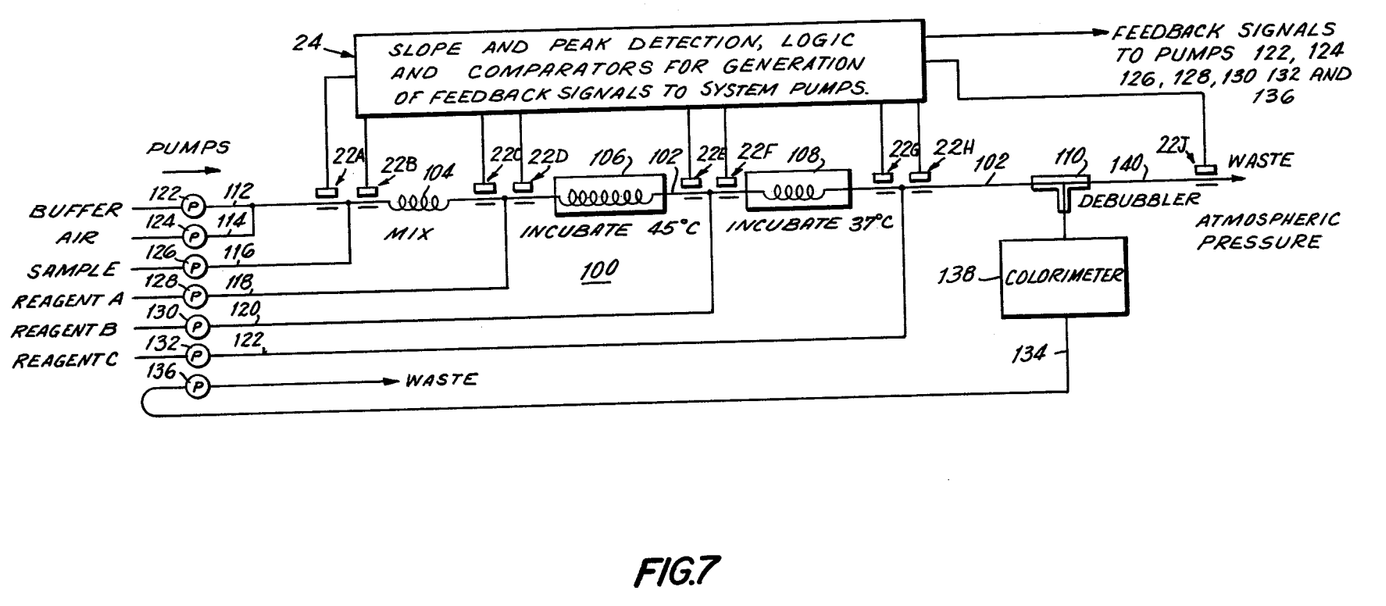
FIG. 7 is a schematic diagram of an application of the system of FIG. 1 to the comprehensive characterization of the continuous flow pattern of an automated analysis system.

A more comprehensive application of the method and apparatus of our invention to the comprehensive characterization of the flow pattern of the segmented fluid stream in a single channel of an automated blood analysis system of the nature referred to hereinabove is schematically illustrated by FIG. 7. As seen therein, said analysis system comprises a manifold as generally indicated at 100 and which includes a primary, optically transparent tube 102 having mixing coil 104 incubators 106 and 108, and debubbler 110 disposed therealong as shown. Tubes 112, 114, 116, 118 and 120 merge as illustrated with tube 102 and respectively function as indicated to continuously introduce a sample, a buffer, air segmentation, and a variety of reagents to tube 102 at flow rates determined by the operational rates of pumps 122, 124, 126, 128, 130 and 132, respectively, to result in the continuous flow of a precisely air-segmented liquid sample stream in primary tube 102 downstream of the juncture thereof with tube 116.

A tube 134 extends as shown from debubbler 110 and is effective in accordance with the operational rate of pump 136 to withdraw portions of each of the liquid segments from tube 102 and pass the same as shown through colorimeter 138; while the remainder of said liquid segments, and the respective air segments, from tube 102 are passed to waste as indicated through tube 140.

Briefly described, the automated analysis system channel of FIG. 7 functions to successively quantitatively analyze each of a series of blood sample portions from a continuous stream thereof for a predetermined constituent by mixture and incubation of said sample portions with a buffer and a plurality of appropriate reagents to effect a change in the same portion optical density proportional to the amount of said constituent in each sample portion, and the subsequent colorimetric analysis of each of the thusly buffered and reacted sample portions to determine the quantity of said predetermined constituent present therein in accordance with Beer's Law.

Flow signal generation means constructed and operative in accordance with the teachings of our invention are indicated generally at 22A, 22B, 22C, 22D, 22E, 22F, 22G, 22H and 22J and are respectively operatively associated as shown with the optically transparent tube 102 at spaced locations on the latter. The respective flow signal generation means are operatively connected as shown to common flow signal processing means 24 of our invention which, in order to avoid undue complexity of illustration, may be understood to here include comparator means in the nature of those depicted in FIGS. 4, 5 and 6 to enable the generation, and application to the system pumps, of appropriate feedback control signals as indicated. This is made possible the particularly precise, comprehensive characterization and control of the continuous flow pattern of the air segmented liquid stream flowing in tube 102.

More specifically, it will be readily understood by those skilled in this art that the difference, for example, in the $Q_L$ signals outputted from flow signal processing means 24 in response to the operation of flow signal generation means 22A and 22B will precisely identify the sample flow rate and may, if desired, be utilized for the generation and application of feedback or difference signals to control the operational rate of pump 126 to correct for any "drift" in that flow rate. In like manner, the difference, for example, in the LB signals outputted from flow signal processing means 24 in response to the operation of flow signal generation means 22B and 22C will precisely identify the difference in air bubble size at the two relevant locations in tube 102 (immediately upstream and downstream of mixing coil 104) to thus provide a precise measurement of the pressure drop across mixing coil 104 (the compressibility of air at the ambient system temperature may be readily ascertained), and this pressure drop may be readily and precisely referenced to ambient pressure in accordance with the LB signal outputted by flow signal processing means 24 in response to the operation of flow signal generation means 22J. Thus, the substantially immediate detection of an obstruction, or leak, which may form in the manifold 100 is made possible.

As additional examples it will be understood that the difference in the $Q_L$ signals outputted by flow signal processing means 24 in response to the operation of flow signal generation means 22A and 22H will precisely identify the total flow of reagents; while the respective differences between the $Q_L$ and LB signals outputted by processing means 24 in response to the operation of flow signal generation means 22C and 22D, 22E and 22F, and 22G and 22H, will precisely identify the respective flow rates and delivery pressures of reagents A, B and C and may, if desired, be utilized for the generation and application of feedback or difference signals to control the respective operational rates of pumps 128, 130 and/or 132 to precisely correct for any "drift" in said reagent flow rates. Although not illustrated, it may be understood that, if a colorimeter which can operate upon an air segmented liquid stream is utilized in place of the colorimeter 138 in the system of FIG. 7, the debubbler 110 and tube 140 could be eliminated, the air segmented liquid stream from tube 102 passed directly through said colorimeter, and flow signal generation means 22 operatively associated with tube 134 to characterize the flow therein as described.

Although disclosed hereinabove primarily with regard to use in conjunction with air segmented, liquid streams, it is to be understood that the method and apparatus of our invention are by no means limited thereto, but rather, would be equally applicable for use in conjunction with liquid streams which were segmented by gases other and different than air, to liquid streams which were segmented by other and different liquids of sufficiently different optical densities, and/or to gas streams wherein one gas were segmented by another gas of sufficiently different optical density.

Various changes may of course be made in the invention as hereinabove described without departing from the spirit and scope of the invention as defined in the appended claims.

What is claimed is:

1. In non-invasive apparatus for the instantaneous measurement of the velocity of flow in an optically transparent conduit of a continuous fluid stream which comprises one fluid segmented by another fluid of different optical density to result in alternating segments of said one fluid and said another fluid, respectively, the improvements comprising, flow signal generation means including a light source disposed to one side of said conduit, position sensitive optical detecting means having an active surface disposed to the other side of said conduit in such manner that the light from said light source which passes through said fluid stream will impinge upon said active surface, said position sensitive optical detecting means being operable to detect the position of the centroid of the light which impinges on said active surface and to provide output signals proportional thereto and which change in accordance with change in said centroid position, means to operate upon said signals to provide a flow signal having a characteristic which is representative of the instantaneous velocity of flow of said segmented fluid stream in said conduit, flow signal processing means operatively connected to said flow signal generation means, means to apply a reference signal representative of the inner diameter of said conduit to said flow signal processing means, and detecting means in said signal processing means operable to detect said characteristic and combine the same with said reference signal to provide a signal indicative of the instantaneous flow rate of said fluid stream through said conduit.

2. In non-invasive apparatus for the instantaneous measurement of the velocity of flow in an optically transparent conduit of a continuous fluid stream which comprises one fluid segmented by another fluid of different optical density to result in alternating segments of said one fluid and said another fluid, respectively, the improvements comprising, flow signal generation means including a light source disposed to one side of said conduit, position sensitive optical detecting means having an active surface disposed to the other side of said conduit in such manner that the light from said light source which passes through said fluid stream will impinge upon said active surface, said position sensitive optical detecting means being operable to detect the position of the centroid of the light which impinges on said active surface and to provide output signals proportional thereto and which change in accordance with change in said centroid position, and means to operate upon said signals to provide a flow signal having a characteristic which is representative of the instantaneous velocity of flow of said segmented fluid stream in said conduit, said characteristic being the rate of change of a portion of said flow signal.

3. In apparatus as in claim 2 further comprising, flow signal processing means operatively connected to said flow signal generation means and operable to detect said characteristic and provide a signal indicative of said instantaneous velocity of flow in response thereto.

4. In apparatus as in claim 2 wherein, said signal processing means comprise slope detector means which are operable to detect the rate of change of said flow signal portion.

5. In apparatus as in claim 2 wherein, said position sensitive optical detecting means comprise an appropriately biased Schottky barrier detector diode.

6. In apparatus as in claim 2 wherein, said means to operate upon said signals comprise a differential amplifier.

7. In apparatus as in claim 2 wherein, said flow signal comprises other characteristics which are representative of the respective lengths of the fluid segments in said fluid stream.

8. In apparatus as in claim 2 wherein, said fluid is a liquid, and said another fluid is a gas.

9. In apparatus as in claim 8 wherein, said gas is air.

10. In apparatus as in claim 9 wherein, said liquid comprises a portion of a blood sample.

11. In non-invasive apparatus for the instantaneous measurement of the velocity of flow in an optically transparent conduit of a continuous fluid stream which comprises one fluid segemented by another fluid of different optical density to result in alternating segements of said one fluid and said another fluid, respectively, the improvements comprising, flow signal generation means including a light source disposed to one side of said conduit, position sensitive optical detecting means having an active surface disposed to the other side of said conduit in such manner that the light from said light source which passes through said fluid stream will impinge upon said active surface, said position sensitive optical detecting means being operable to detect the position of the centroid of the light which impinges on said active surface and to provide output signals proportional thereto and which change in accordance with change in said centroid position, and means to operate upon said signals to provide a flow signal having a characteristic which is representative of the instantaneous velocity of flow of said segmented fluid stream in said conduit, said flow signal comprising other characteristics which are representative of the respective lengths of the fluid segments in said fluid stream, said other characteristics being the time duration between respective maximum and minimum levels of said flow signal, and signal processing means comprising peak detector means to detect said maximum and minimum flow signal levels.

12. In non-invasive apparatus for the instantaneous meansurement of the velocity of flow in an optically transparent conduit of a continuous fluid stream which comprises one fluid segmented by another fluid of different optical density to result in alternating segments of said one fluid and said another fluid, respectively, the improvements comprising, flow signal generation means including a light source disposed to one side of said conduit, position sensitive optical detecting means having an active surface disposed to the other side of said active surface, said position sensitive optical detecting means being operable to detect the position of the centroid of the light which impinges on said active surface and to provide output signals proportional thereto and which change in accordance with change in said centroid position, and means to operate upon said signals to provide a flow signal having a characteristic which is representative of the instantaneous velocity of flow of said segmented fluid stream in said conduit, wherein the lengths of said segments of said one fluid are substantially equal, and the lengths of said segments of said another fluid are substantially equal, and wherein the length of said active surface is greater than the length of either of the segments of said one fluid or the segments of said another fluid.

13. In apparatus as in claim 12 wherein, the length of said active surface is aproximately twice that of the length of the segments of said one fluid, and the length of the segments of said one fluid is approximately five times that of the length of the segments of said another fluid.

14. In non-invasive apparatus for the instantaneous measurement of the velocity of flow at spaced locations in an optically transparent conduit of a continuous fluid stream which comprises one fluid segmented by another fluid of different optical density to result in alternating segments of said one fluid and said another fluid, respectively, the improvements comprising, flow signal generation means operatively associated with said optically transparent conduit at each of said spaced locations, each of said flow signal generation means including a light source disposed to one side of said conduit, position sensitive optical detecting means having an active surface disposed to the other side of said conduit in such manner that the light from said light source which passes through said fluid stream will impinge upon said active surface, said position sensitive optical detecting means being operable to detect the position of the centroid of the light which impinges on said active surface and to provide output signals proportional thereto and which change in accordance with change in said centroid position, means to operate upon said signals to provide a flow signal having a characteristic which is representative of the instantaneous velocity of flow of said segmented fluid stream at each of said spaced locations in said optically transparent conduit, flow signal processing means operatively connected to said flow signal generation means, means to apply a reference signal representative of the inner diameter of said conduit to said flow signal processing means, and detecting means in said signal processing means operable to detect said characteristic and combine the same with said reference signal to provide a signal indicative of the instantaneous flow rate of said fluid stream at each of said spaced locations in said optically transparent conduit to thereby enable the characterization of the flow of said fluid stream in said conduit.

15. In a method for the non-invasive instantaneous measurement of the velocity of flow in an optically transparent conduit of a continuous fluid stream which comprises one fluid segmented by another fluid of different optical density to result in alternating segments of said one fluid and said another fluid, respectively, the steps of, directing light through said fluid stream to impinge upon the active surface of position sensitive optical detecting means which are operable to detect the position of said impinging light and provide output signals which are proportional thereto and which change in accordance with changes in said position, operating upon said signals to provide a flow signal having a characteristic which is representative of the instantaneous velocity of flow of said segmented fluid stream in said conduit, and detecting said characteristic and combining the same with a signal representative of the inner diameter of said conduit to provide a signal indicative of the instantaneous flow rate of said segmented fluid stream in said conduit.

16. In a method for the non-invasive instantaneous measurement of the velocity of flow in a optically transparent conduit of a continous fluid stream which is segmented by another fluid of different optical density to result in alternating segments of said one fluid and said another fluid, respectively, the steps of, directing light through said fluid stream to impinge upon the active surface of position sensitive optical detecting means which are operable to detect the position of the centroid of said impinging light and provide output signals which are proportional thereto and which change in accordance with changes in said centroid position, operating upon said signals to provide a flow signal having a characteristic which is representative of the instantaneous velocity of flow of said segmented fluid stream in said conduit, and detecting said characteristic and combining the same with a signal representative of the inner diameter of said conduit to provide a signal indicative of the instantaneous flow rate of said segmented fluid stream in said conduit.

17. In a method for the non-invasive instantaneous measurement of the velocity of flow at spaced locations in an optically transparent conduit of a continuous fluid stream which is segmented by another fluid of different optical density to result in alternating segments of said one fluid and said another fluid, respectively, the steps of, directing light through said fluid stream at each of said spaced locations to impinge upon the active surface of position sensitive optical detecting means which are operable to detect the position of the centroid of said impinging light and provide output signals which are proportional thereto and which change in accordance with changes in said centroid position, operating upon said signals to provide a flow signal having a characteristic which is representative of the instantaneous velocity of flow of said segmented fluid stream at each of said spaced locations, and detecting said characteristic and combining the same with a signal representative of the inner diameter of said conduit to provide a signal indicative of the instantaneous flow rate of said segmented fluid stream at each of said spaced locations to thereby enable the characterization of the flow of said fluid stream in said conduit.

* * * * *